INVENTOR
LENNART A. STENSTROM

BY

AGENT

United States Patent Office 3,490,728
Patented Jan. 20, 1970

3,490,728
RESILIENT SUPPORTING DEVICE
Lennart Arvid Stenström, Huddinge, Sweden, assignor to U.S. Philips Corporation, New York, N.Y., a corporation of Delaware
Filed Nov. 6, 1967, Ser. No. 680,694
Claims priority, application Sweden, Nov. 10, 1966, 15,430/66
Int. Cl. F16f 15/04
U.S. Cl. 248—358
7 Claims

ABSTRACT OF THE DISCLOSURE

A resilient support for a sensitive instrument such as inertial instruments which serve as platforms for inertial navigation in which an instrument holder is supported on a base by compression springs obliquely mounted relative to a horizontal plane and being maintained under compression by compression means acting in a horizontal direction which allow linear displacement of the holder in a vertical direction, the vertical component of the spring force outbalancing the weight of the holder and its components attached thereto, the dimensioning and compression degree of the spring being such that vertical motions of the holder have little or no effect.

---

The invention refers to a device for resilient support of a body in a foundation, in particular but not exclusively resilient support of inertial instruments as platforms for inertial navigation and vertical indicating platforms which may be arranged in vehicles as aeroplanes or ships. Such vehicles carrying the inertial instruments are, during travel, subjected to vibrations which propagate through the support to the outer gimbal in the platform system. When the vibrations penetrate to the gyroscopes and accelerometers included in the system there will be errors which for their kind and size are dependent upon the shape of the vibrations. Even if it is possible by certain measures to eliminate or compensate the effect of such errors to a certain extent it can generally be said that both gyroscopes and other platform instruments will produce more accurate data if they are not imparted vibrations. This is valid both for angular and linear vibrations.

Previously it has been common to support the platform system in a number of shock absorbers of rubber or steel wool, which connect the outer gimbal with the vehicle. These shock absorbers must necessarily be made relatively strong in order to take up the high accelerations appearing during flight and at the same time ensuring that the angular movements between the outer gimbal and the body of the vehicle will not be of unallowable size. It is namely also a requirement that these motions are maintained at a low level because each angular deflection between the outer gimbal and the body of the vehicle results in a corresponding error in the attitude information from the platform system. The rigidness of the support results in turn in that the system will have a high natural frequency. Only vibrations having a frequency which essentially exceeds the natural frequency are suppressed by the support, while vibrations of lower frequency will propagate to the outer gimbal. A support is required therefore which has as low natural frequency as possible, i.e. is as low as possible for achieving effective suppression of vibrations at the same time that it does not give rise to angular errors.

The vibrations appearing in aeroplanes are inter alia caused by the fact that the body of the aeroplane is relatively weak and therefore under influence of different internal and external forces which impart bending oscillations, which within the body of the aeroplane appear substantially as transverse linear vibrations. The resilient support therefore has for its main purpose to isolate against such linear oscillations having their main direction perpendicular to the length direction of the aeroplane body. The greatest vibrations are usually appearing in a direction perpendicular to the plane of the wings, i.e. in a direction coinciding with the force of gravity during level flight. The highest requirements as regards the resilient support thus appear in a direction in which the system at the same time normally has to take up the whole weight of the supported body. In the length direction of the aeroplane there are smaller vibrations and consequently there are smaller requirements laid upon the resilient support in this direction.

The invention has for its purpose to produce a device for resilient support of a body in a foundation within a limited space, which support for achieving effective suppression of vibration in the foundation has firstly the properties that it has low natural frequency in a vertical direction, i.e. in a direction coinciding with the direction in which the weght of the supported body acts upon the device.

According to the invention a holder for sensitive instruments such as inertial guidance platform is resiliently supported on a base by compression springs which are obliquely mounted relative to a horizontal plane between the holder and the base. These springs are maintained under compression by means acting in a horizontal direction which allow linear displacement of the holder in a vertical direction. The spring force has a vertical component which balances out the weight of the holder and its attached components while the dimensioning and degree of compression of the spring are such that vertical motions of the holder have little or no effect.

The invention is based upon the use of compression springs and in particular the property of a compression spring is utilized, that its transverse spring constant can be chosen as required from high positive to negative values. The transverse spring constant depends upon the actual dimensioning of the spring, thus its diameter, spring constant, free length and length in compressed condition. A spring with a relatively large diameter in relation to its length, which spring connects a movable body with a fixed base, will with a transverse displacement of the movable body tend to return the body to an equilibrium position, which means that it has a positive transverse spring constant. A long weak spring which is kept suitably compressed will under the same conditions due to the compression tend to push the movable body away from a central equilibrium position, which means that it has a negative transverse spring constant. For a certain dimensioning of the spring it appears that the force required for bending the spring transversely will be equal to the force which tends to push the body away from the central position, i.e. the transverse spring constant for small deflections will be practically equal to zero. The invention is based upon the idea of using compression springs having a dimension corresponding substantially to the said last case for achieving a support which has as small a resilience force as possible. But as the small resilience force shall appear in a direction which coincides with the vertical direction the problem arises that the weight of the supported body must be taken up under maintenance of the small resilience force. This is in principle solved by an oblique setting of the compression springs and a strong compression of the same. Thus the invention is characterized in that the holder of the supported body is connected with the base through one (or more) compression spring(s) which is (are) adjusted somewhat obliquely upwardly relative to the horizontal plane H and which spring(s) is (are) maintained compressed by compression means arranged between the holder and the base and acting upon the holder substantially in horizontal direction and which compression means allow linear displacement of the holder in vertical direction, the spring compression being adapted such that relative to the oblique setting the vertical component of the spring force in the length direction of the spring will outbalance the weight of the holder with components attached thereto and the dimension and compression degree of the spring being further such that the spring in respect of vertical motions of the holder relative to the base will behave indifferently or have a small positive spring constant.

The body is suitably guided such that it is free to move linearly both in vertical direction and a horizontal direction perpendicular to the length direction of the springs, in which case these springs will serve as vibration attenuator also in the said last direction. As a result of the oblique setting, the springs will be compressed somewhat at displacement downwardly and extended somewhat at displacement upwardly. This will produce a small positive spring constant for the said motion even if the transverse spring constant of the springs as such is equal to zero. But as it is the same spring which produces the spring constant in a horizontal direction and in a vertical direction a parallel orientation of the springs in the horizontal plane should then result in different spring constants in vertical direction and in the said horizontal direction. This can be compensated by setting the springs obliquely also as seen in a horizontal plane but as the springs shall not take up any resulting force in this direction they are directed obliquely against each other so that they will outbalance each other. By suitable choice of the oblique setting angles it is possible to achieve desired values of the spring constants in a vertical and a horizontal direction respectively and thereby the required natural frequencies in the respective direction. The high compression of the spring or springs insures that the supported body is automatically locked as regards rotation about axes which are perpendicular or substantially perpendicular to the length direction of the springs, because it is in principle necessary for producing rotational movements about the said axes to overcome the pre-stress of the springs. On the contrary for rotation about an axis which is substantially parallel with the length direction of the springs the system will only give a counter-torque which corresponds to the said small transverse spring constant. For preventing angular errors or oscillations the described resilient supporting device is therefore combined with a separate device which locks the body for the said rotation, but allows the required linear movements.

The invention will be described with reference to the accompanying drawing in which FIG. 1 is a side elevational view partly in section;

Figure 1:
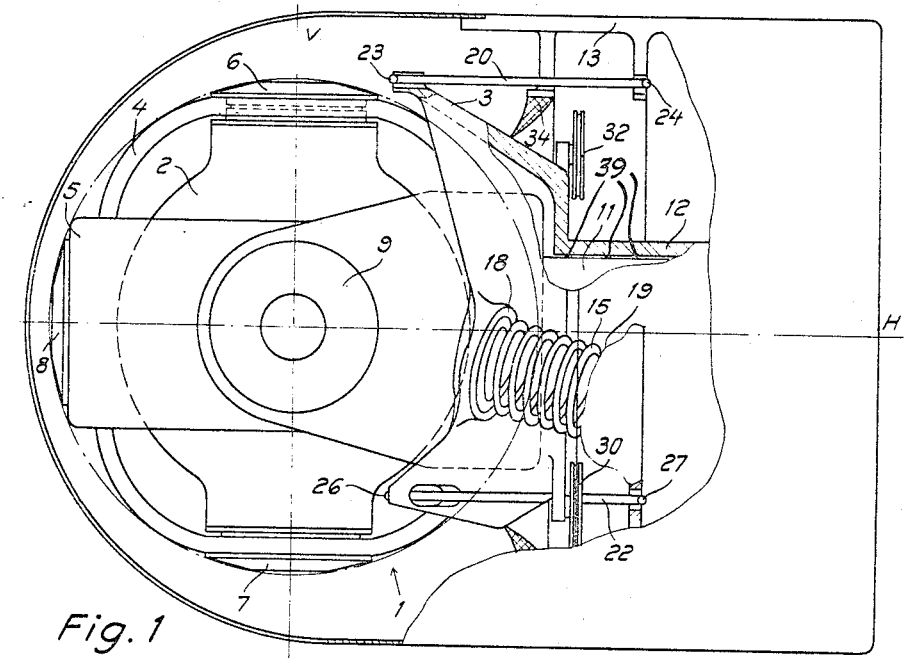
Figure 2:
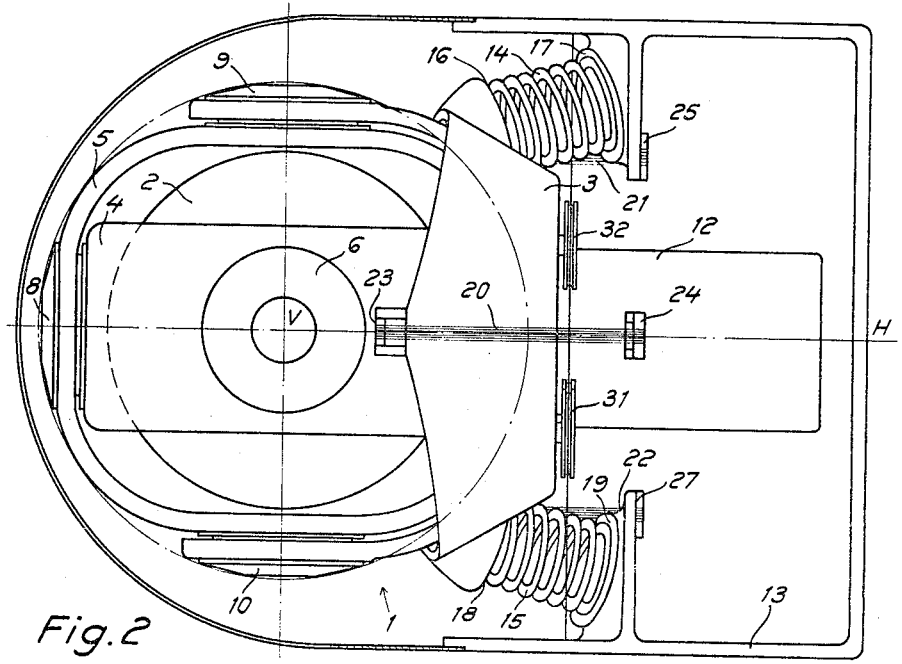
FIG. 2 is a top plan view partly in section.
Figure 3:
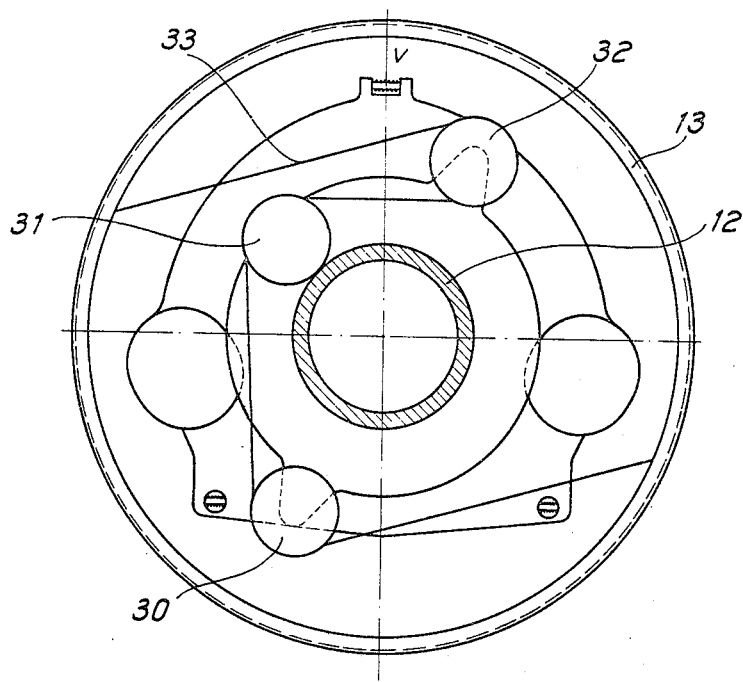
FIG. 3 is a front elevational view partly in section of a resilient support for a holder of sensitive instruments according to the invention.

The shown device is assumed to be mounted in the aeroplane such that the line H is parallel with the length direction of the aeroplane and the line V perpendicular to the plane of the wings. H thus represents the horizonanl plane in normal level flight, while V represents the vertical. The following description is valid for the case that the aeroplane flies in level flight, it being understood that the resilient support will have different and worse properties during those moments of the flight when the aeroplane deviates appreciably from this position.

In the drawing reference numeral 1 designates a platform unit consisting of a platform 1 for inertial navigation or the like, which platform is gimbal supported in a holder 3 through gimbals 4, 5 and bearings 6, 7, 8, 9, 10 for the gimbals. For the following reasons the gimbal system is not rigidly connected to the holder but mounted on a base portion 11 which is displaceable in a sleeve portion 12 of the holder. The holder 3 is in turn mounted in an envelope 13 connected with the aeroplane body through a resilient system comprising two compression springs 14, 15. The springs are fixed in oblique compression surfaces 16, 17, 18, and 19 on the holder and envelope respectively, which surfaces are so arranged that the two springs are kept directed obliquely upwardly relative to H, i.e. relative to the horizontal plane in normal level flight. The oblique setting angle shown in about 15°. The springs are also set obliquely seen from above, i.e. in the horizontal plane but here in opposite direction so that they act against each other. The oblique setting angle is also about 15°. The springs are kept highly compressed by means of three flexible steel wire bundles 20, 21 and 22 which are fixed in the holder 3 and the envelope 13 respectively by locking pins 24, 25 and 27, the points of connection between the wire bundles and the holder and envelope being situated such that the bundles are normally oriented in direction H, i.e. form the angle 15° with the length direction of the springs. Thus the supported body will be influenced on the one hand by the compression force from the springs in a direction oblique upwardly and on the other hand by the tension force from the steel wire bundles in a direction which is substantially horizontal and also by the gravity in direction downwardly. The springs are then according to the invention dimensioned and compressed such that the vertical component of the compression force acting in the length direction of the springs is substantially equal to the weight of the supported body. This means that the springs will support the body without being bent under its weight, i.e. without being pre-stressed in transverse direction.

The steel wire bundles which have imparted thereto a strong tensile force and are kept stretched will allow linear displacement of the platform unit vertically and laterally. Due to the length of the bundles relative to the small movements which can arise the said displacements vertically and laterally can be regarded as substantially linear.

The springs are according to the invention further dimensioned such that they for linear movements in a vertical and if required also in a horizontal direction behave indifferently or have a very small spring constant in the respective direction. As the oblique setting of the springs gives a positive contribution to the spring constant of the resilient system as a whole in the two transverse directions it is necessary if a quite indifferent support is required to dimension and fix the springs such that they have increased transverse lability (an addition of negative spring constant for transverse motions). This is achieved for example by making the springs thin in relation to their length.

An example of the dimensioning in a practical embodiment is given in the following:

| | | |
|---|---|---|
| Total weight of the supported system | kg | 5 |
| Total spring compression force | kp | 21 |
| Initial length of the springs | mm | 100 |
| Length of the springs in compressed condition | mm | 45 |
| Oblique setting angle relative to the horizontal plane | degrees | 15 |
| Oblique setting angle in the horizontal plane | do | 15 |
| Resulting natural oscillation frequency in vertical direction | c./s. | 1 |
| Resulting natural oscillation frequency in horizontal direction | c./s. | 1 |

The highly pre-stressed substantially unelastic wire bundles will lock the body against non-required rotational movements about V and a horizontal axis perpendicular to H. On the contrary the spring system will as regards rotational movements about H only produce a counter-torque corresponding to the said small spring constant in a transverse direction of the spring. In order to prevent that this will lead to angular errors or angular vibrations of the supported body there is a device which locks the body with regard to rotational movements about H but allows the said linear motions. The locking device for rotational motions about H consists in the shown example of a parallel guiding system comprising pulleys 30, 31, 32 and a cord 33. The pulleys are rotatably supported on the holder 3 of the platform unit and the cord running over the pulley is at both ends fixed in the outer envelope 13. The cord is maintained stretched by means of a suitable device which imparts to the supported body a torque about H, for example a tension spring arranged between the holder and the envelope. According to another alternative the required torque about H can be produced by giving the compression springs somewhat different oblique setting angles relative to the horizontal plane. Due to the high compression force of the springs, the required torque is achieved with a very small difference in oblique setting angles, for example of the magnitude 1–2°. Provided that the cord is kept stretched, the shown device will lock the body for rotational movement about H, while it allows transverse motion in both a horizontal and a vertical direction. The pulleys will for movements in horizontal direction run along the cord so that the pulleys are rotated under parallel guidance of the supported body in a way known per se. Also for movement in vertical direction an essentially parallel guidance of the body is achieved for relatively small deflections due to the fact that the end parts of the cord are parallel and have a substantial length. The additional pulley 31 is arranged in order that the cord shall run free from the sleeve portion 12 but is otherwise unessential.

The holder 3 is in direction H, i.e. in the length direction of the aeroplane practically rigidly connected to the aeroplane body through the highly pre-stressed wire bundles which means that vibrations in this direction will penetrate to the holder practically without attenuation. In order that these vibrations shall not penetrate directly to the platform unit there is a resilient connection between the holder and the platform unit. The resilient connection in direction H in the example shown is achieved in that the gimbal system is mounted on a base portion 11, as previously mentioned, which base portion is displaceably arranged in the sleeve 12, the portion 11 being further connected with the holder throgh resilient diaphragms or bundles of thin metallic sheet strips 39.

Instead of using flexible wires or bundles of wires for guidance of the supported body and for producing the prestress in the compression springs under allowance of the linear displacements, pre-compression can alternatively be produced by a system of balls situated between compression surfaces on the movable body and a portion connected with the vehicle respectively. If the bearing surfaces are shaped as V grooves the ball system can also serve as locking device for rotational movement, in which case, if displacement in two directions are to be allowed, two such systems must be arranged operating on the one hand between the portion connected with the vehicle and a disk or ring shaped intermediate portion and on the other hand between this intermediate portion and the supported body and each allowing displacement in one of the directions.

The shown and described resilient support has as mentioned extremely small spring constant for displacements in directions perpendicular to the length direction of the aeroplane during normal conditions, i.e. substantially during level flight. This means, however, that the resilient support cannot take up the inertial forces influencing the supported body at the presence of heavy accelerations or under unfavourable conditions of other kind, for example if the aeroplane should fly with the upside down. The resilient support with low spring constant is therefore combined with a second resilient system having larger and suitably progressive spring constant, which second system is put into function at great deflections of the supported body relative to the vehicle. The second spring system may for example consist of a rubber ring as indicated at 34, which ring has a suitably shaped profile so that it gives a resilient force at increasing deflection, which follows a required function.

The described resilient support with low spring constant first in a vertical direction is not only usable for supporting inertial navigation platforms in vehicles but can also be used for supporting sensitive apparatus of another kind, which are to be mounted in mobile or ground-fixed fundaments such that they are isolated from linear vibrations in the base, for example vertical indicating and north indicating platforms for fire control, sensitive balances, gravimeters etc.

What is claimed is:

1. A resilient support for sensitive instruments comprising an instrument holder mounted in a base, at least one compression spring connecting said holder to said base and extending obliquely upwardly relative to the horizontal plane (H), said spring being maintained compressed by compression means arranged between the holder and the base and acting upon the holder substantially in a horizontal direction, said compression means allowing linear displacement of the holder in a vertical direction, said spring under compression having a vertical component of the spring force in the length direction of the spring which outbalances the weight of the holder with components attached thereto, said spring having dimensions and a degree of compression such that vertical movements of the holder will have substantially no effect upon the spring.

2. A resilient support as claimed in claim 1 in which the holder can be displaced in the vertical direction and can move linearly in a horizontal direction transversely to the springs and is supported by an even number of compression springs directed, in a horizontal projection, obliquely against each other with an oblique setting angle which is adapted for producing a suitable spring constant for horizontal linear motions in a direction perpendicular to the vertical symmetry plane of the springs.

3. A resilient support as claimed in claim 2, including means active between the holder and the base for locking the holder relative to the base as regards rotational motions about an axis which is substantially parallel with the length direction of the springs.

4. A resilient support as claimed in claim 1, in which the said means for compression of the spring consists of flexible wires.

5. A resilient support as claimed in claim 3, in which the said means for locking the holder for rotational motions comprises a system of pulleys arranged on the holder and at least one strand-like member fixed in the base and running over the pulleys for allowing parallel displacement of the holder.

6. A resilient support as claimed in claim 1, in which the holder is connected with an instrument being supported via an intermediate portion which is displaceable substantially in the length direction of the springs relative to the holder, and a resilient connection is arranged between the holder and the said last intermediate portion.

7. A resilient support as claimed in claim 1 in which the support is combined with a second spring system arranged between the holder and the base in parallel with the said resilient support and is adapted to influence the holder with a spring force which at least for great deflections of the holder from an equilibrium position is appreciably larger than that produced by the said resilient support, whereby the resulting natural frequency will increase with increasing deflections from the said low value at small deflections.

References Cited

UNITED STATES PATENTS

| | | | |
|---|---|---|---|
| 2,932,482 | 4/1960 | Dickie | 248—358 |
| 3,110,464 | 11/1963 | Baratoff et al. | 248—20 |
| 3,151,833 | 10/1964 | Thrasher | 248—358 |
| 3,268,199 | 8/1966 | Kordyban et al. | 248—350 |
| 3,291,249 | 12/1966 | Bays | 248—21 XR |

CHANCELLOR E. HARRIS, Primary Examiner

JOHN PETO, Assistant Examiner

U.S. Cl. X.R.

267—1